United States Patent

O'Brien et al.

[15] 3,676,336

[45] July 11, 1972

[54] METHOD AND APPARATUS FOR WATER SOFTENING

[72] Inventors: Dennis M. O'Brien, Morristown; Cole R. Miller, Medford Lakes, both of N.J.

[73] Assignee: Ecodyne Corporation, Chicago, Ill.

[22] Filed: Jan. 11, 1971

[21] Appl. No.: 105,188

[52] U.S. Cl. ....................................210/25, 210/30, 210/87, 210/96
[51] Int. Cl. .........................................................B01d 15/04
[58] Field of Search ..................................210/25, 30, 87, 96

[56] References Cited

UNITED STATES PATENTS

| | | | |
|---|---|---|---|
| 3,366,241 | 1/1968 | McMorris | 210/96 |
| 3,574,330 | 4/1971 | Prosser | 210/96 |
| 3,581,894 | 6/1971 | Minart | 210/96 |

*Primary Examiner*—Samih N. Zaharna
*Attorney*—Hume, Clement, Hume & Lee, Ltd.

[57] ABSTRACT

The invention provides an improved method and apparatus for controlling the provision of regenerated resin to an ion-exchange column. In carrying out the method, the conductivity of the raw water flowing to the column and the flow of water delivered to the column are measured. The conductivity is then multiplied by the flow, and the product of the conductivity and flow is totalized. The column is provided with regenerated resin when the total of this product reaches a pre-determined amount.

The apparatus comprises an improvement in a conventional ion-exchange system having a service column containing ion-exchange resin and raw water delivery means for delivering raw water to the service column. Generally, the invention comprises an improved control system having conductivity means for measuring the conductivity of the water in the raw water delivery means and flow measuring means for measuring the flow of water through the service column. Multiplier means are provided for multiplying the conductivity by the flow, and totalizer means totalize the product of these functions. Means are provided for automatically providing the service column with regenerated resin responsive to a signal from the totalizer means indicating that the total of the product has reached a pre-determined amount.

14 Claims, 3 Drawing Figures

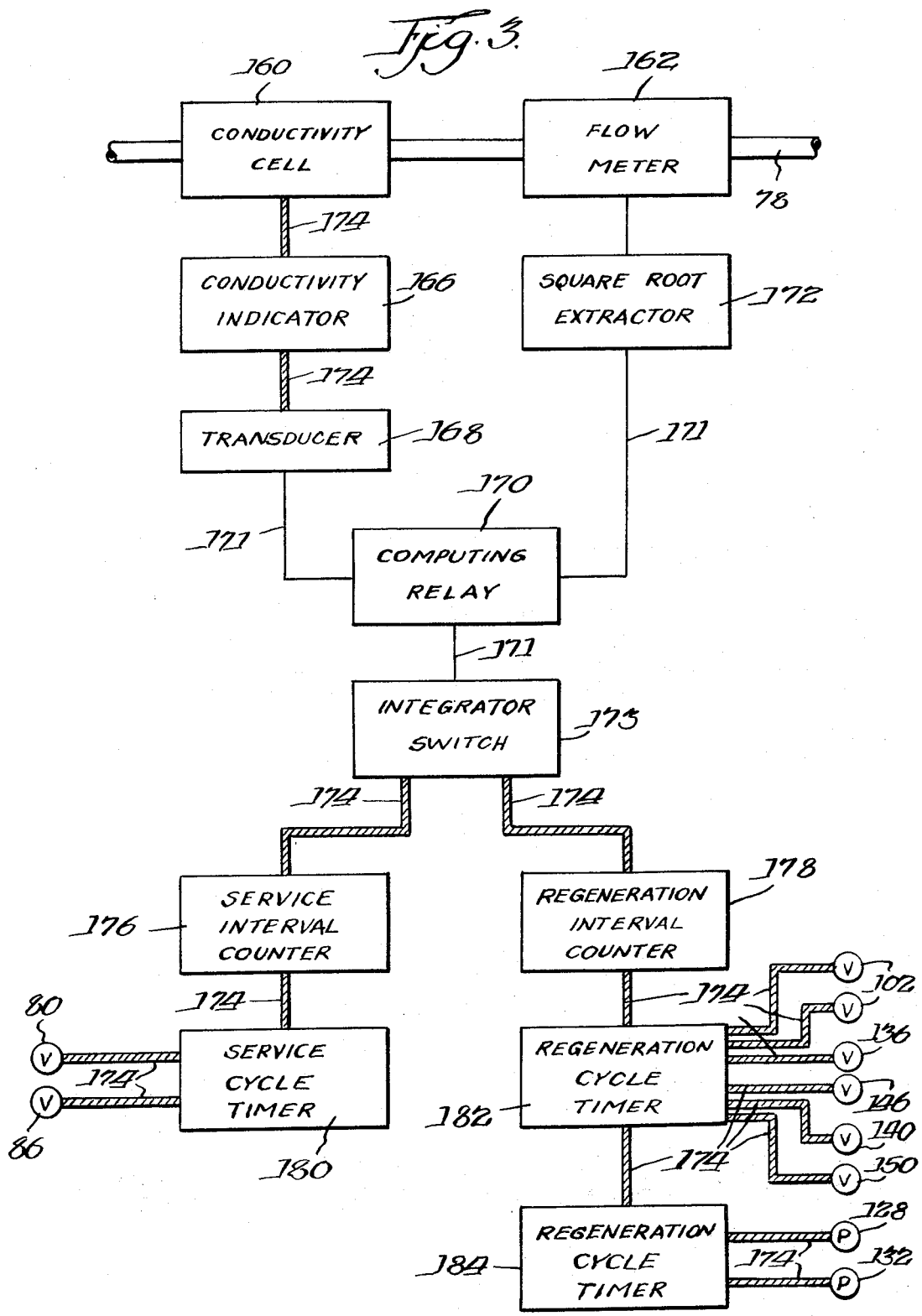

METHOD AND APPARATUS FOR WATER SOFTENING

The present invention relates to an improved method and apparatus for controlling the provision of regenerated resin to an ion-exchange column.

A wide variety of ion-exchange systems are well known in the art. These systems may be employed for the simple "softening" of water, wherein the so-called "hard" ions, such as calcium and magnesium, are replaced with "soft" ions such as sodium. Other systems "demineralize" the water by removing undesired ions and replacing them with hydrogen and hydroxyl ions. In all such systems, the ion-exchange resins become exhausted as they exchange the desired ions for the undesired ions in the raw water being treated. It is thus necessary to periodically provide an ion-exchange column with regenerated resin.

Methods for regenerating the resin also vary from the relatively simple to the highly sophisticated. A simple system is employed in home water softeners, wherein the water softener is periodically shut down and a salt solution is automatically delivered to the resin in the tank. A similar system is employed with some fixed-bed demineralizer systems, wherein the system is periodically shut down and an acid or a base is delivered to the column to regenerate the resin.

In more sophisticated systems, the resin in the service column is transferred to a regeneration column for treatment with a regenerant. Such a system avoids a requirement for shutting down the delivery of raw water to the service column during the entire regeneration cycle. In some systems, the service column is provided with a mixed bed of anion and cation exchange resins, and separation means are provided for separating the resins. After the resins are separated, they are delivered into anion and cation regeneration columns, where they are separately regenerated. The regenerated resins are then re-mixed and returned to the service column.

Basically the exhaustion of ion-exchange resins is proportional to two things: the volume of water passed through the ion-exchange service column and the concentration of undesired ions in the water being treated. Any increase or decrease in either volume or concentration can increase or decrease the rate at which the resin is exhausted, and, therefore, the frequency with which regenerated resin must be provided. Despite the presence of these two factors, the provision of regenerated resin to an ion-exchange service column has heretofore generally been controlled on the basis of time. That is, a timer would ensure the provision of regenerated resin to the service column with sufficient frequency so as to supply adequate regenerated resin, based on periods of the highest anticipated flow volume and ion content. Naturally, when the demand for regenerated resin was lessened, there was a significant amount of wasted regenerant. In systems where resin transfer is involved, there was also excessive transfer of the resin, which results in increased mechanical abrasion and shortened resin life.

Generally, the present invention provides an improved method and apparatus for providing regenerated resin to an ion-exchange column. The method and apparatus provide an adequate supply of regenerated resin during periods of high demand, but reduce the amount of regenerated resin supplied during periods of reduced demand, resulting in improved operating economy.

In carrying out the method, the conductivity of the raw water flowing to an ion-exchange column is measured. The flow of water delivered to the column is also measured. The conductivity is then multiplied by the flow, and the product of conductivity and flow is totalized. The column is then provided with regenerated resin when the total of the product reaches a pre-determined amount, indicating that regenerated resin is needed.

The apparatus comprises an improvement on a conventional ion-exchange system having a service column containing ion-exchange resin and raw water delivery means for delivering raw water to the service column. The improved control system of the present invention comprises conductivity measuring means for measuring the conductivity of the water in the raw water delivery means and flow measuring means for measuring the flow of water through the service column. Multiplier means are provided for multiplying the conductivity by the flow. Totalizer means are provided for totalizing the product of conductivity and flow. Finally, means are provided for automatically providing the service column with regenerated resin responsive to a signal from the totalizer indicating that the total of the products has reached a pre-determined amount. Such regenerated resin may be provided either by regenerating the resin within the column, or by delivering regenerated resin to the column.

The invention, its construction and method of operation, together with further objects and advantages thereof, will be best understood by reference to the following detailed description, taken in conjunction with the drawings, in which:

FIG. 3 is a diagrammatic detail view of the control system employed for the ion-exchange system shown in FIG. 2.

It is well known that there is a correlation between the conductivity of water and its ion content. Thus, the product of the conductivity and the flow rate produces a measurement that is proportional to the number of ions being passed through an ion-exchange column, and thus the number of ions which must be exchanged by the resin. Of course, as is well known, all ions do not have the same conductivity or the same concentrations. Thus, it is best to have a fair idea of the kind of ions that will be encountered in an ion-exchange process, in order to carry out the method of the present invention. Once the kind of ions in the water is known, the conductivity of these ions may be used as a basis calibrating the apparatus, i.e., for determining the weight to be given to the conductivity of the raw water when multiplying the conductivity by the flow rate. For this reason, the method and apparatus of the present invention must be calibrated for the primary impurity or impurities expected in the raw water supply.

The product of conductivity and flow rate in the calibrated system is totalized, giving an indication of the total number of ions that have been delivered to the ion-exchange column. The column is provided with regenerated resin when the total of this product reaches a pre-determined level. This provision of regenerated resin may be accomplished by either regenerating the resin within the column itself or by delivering regenerated resin to the column when required. In the instance where the ion-exchange resin is in a mixed bed, it is necessary to separate these resins prior to regeneration. This ordinarily requires removal from the column.

Figure 1:
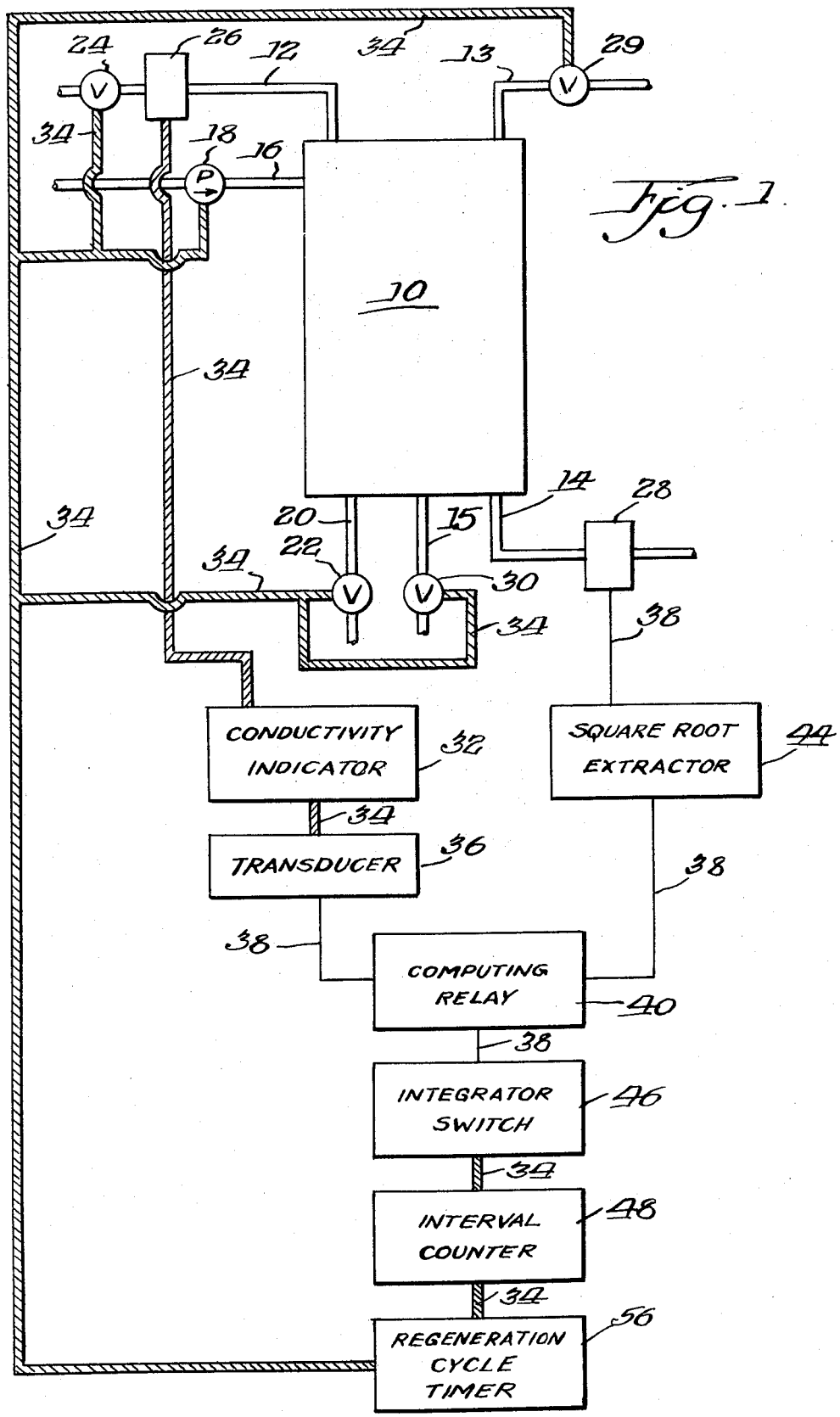
FIG. 1 is a diagrammatic view of a simple ion-exchange system embodying the features of the present invention.

Referring to the drawings, FIG. 1 shows a relatively simple ion-exchange system incorporating the features of the present invention. This system comprises an ion-exchange service column of conventional design, indicated by reference numeral 10, containing ion-exchange resin, for example a strong acid cation exchange resin in the hydrogen form. The column 10 has a raw water inlet pipe 12 and a backwash outlet pipe 13 communicating with an upper portion thereof, and has a treated water outlet pipe 14 and a backwash water inlet pipe 15 communicating with a lower portion thereof. A regenerant inlet pipe 16 having a regenerant pump 18 communicates with an upper portion of the column, while a drain pipe 20 having a drain valve 22 communicates with the lower portion.

The raw water inlet pipe 12 has a raw water valve 24 and a conductivity cell 26 located thereon. The treated water outlet pipe 14 has flow measuring means, in this instance a flow meter 28. The backwash outlet pipe 13 and the backwash inlet pipe 15 each have valves 29, 30, respectively.

The conductivity cell 26 is connected by means of electrical conduit 34 to a conductivity indicator 32. Both the conductivity cell 26 and the conductivity indicator 32 are conventional items, well known to those skilled in the art. The conductivity indicator 32 amplifies the signal produced by the conductivity cell 26, and produces a linear electrical signal having a voltage corresponding to the conductivity of the liquid passing through the raw water inlet pipe 12.

The conductivity indicator 32 is connected by means of electrical conduit 34 to a transducer 36, which transforms the electrical signal of the conductivity indicator 32 into a fluidic signal, in this instance a pneumatic signal having a pressure proportional to the conductivity. This pneumatic signal is delivered through an air line 38 to a computing relay 40, where it is multiplied by the flow rate signal, as hereinafter described.

The flow rate may be measured in any convenient point for measuring the rate of flow through the column. In this instance, the flow rate is measured by a flow meter 28 located on the raw water inlet pipe 12. Suitable flow meters are well known to those skilled in the art. One well-known type of meter produces a pneumatic signal which is proportional to the square root of flow. This pneumatic signal is delivered through an air line 42 to a square root extractor 44, which transforms the signal into a linear signal having a pressure proportional to the flow rate. This pressure signal is then delivered through an air line 38 to the computing relay 40.

The computing relay 40 forms a multiplier means for multiplying the conductivity by the flow rate. The relay 40 delivers a pneumatic signal through an air line 38 to an integrator switch 46. The integrator switch 46 produces a signal, in this instance an electronic pulse, each time the product of the conductivity and flow rate signals reaches a pre-determined level or quantum. This pulse is transmitted to an interval counter 48 through electrical conduit 34.

The interval counter 48 counts the number of pulses delivered from the integrator switch 46. When the number of pulses reaches a pre-determined number, the interval counter 48 delivers a signal to a regeneration cycle timer 56. In the regeneration cycle, the regeneration cycle timer 56 first signals the automatic raw water valve 24 to close by a signal delivered through an electrical conduit 34. At the same time, the cycle timer 56 signals the valves 29, 30 on the backwash outlet pipe 13 and on the backwash water inlet pipe 15 to open, and the ion exchange resin is backwashed by an upflow of water for a suitable pre-determined interval. The valves 29, 30 are then automatically closed responsive to a signal from the regeneration cycle timer 56.

Subsequent to or simultaneous with the closing of the valves 29, 30 on the backwash outlet and inlet pipes 13, 15, respectively, the drain valve 22 is opened and the regenerant pump 18 is started, again by a signal from the timer 56.

Since the resin will have reached a pre-determined state of exhaustion, the amount of regenerant that is required can be accurately pre-determined. The regeneration cycle timer 56 is set to permit delivery of regenerant to the resin for a time period that is sufficient to regenerate the resin. The rate of delivery of the regenerant will have been determined by the size and setting of the pump 18.

After the regeneration has been completed, the regeneration cycle timer 56 will deliver a signal through the electrical conduit 34 to stop the regenerant pump 18. The regeneration cycle timer 56 will then signal the beginning of the rinse cycle, in this instance by signaling the opening of the raw water valve 24, while the drain valve 22 remains open. Of course, if it is desired to rinse the resin with softened or demineralized water, a separate rinse water inlet pipe (not shown) can be provided.

After sufficient time has been permitted for rinsing the resin, the regeneration cycle timer 56 provides a signal to close the drain valve 22, so that the delivery of treated water to the service column through the treated water outlet pipe 14 is resumed. Simultaneously, the regeneration cycle timer 56 delivers a signal to the interval counter 48 to reset the counter 48 so that it will again totalize product of the conductivity and flow rate as delivered to the computing relay 40 by the transducer 36 and the square root extractor 44, respectively.

Figure 2:
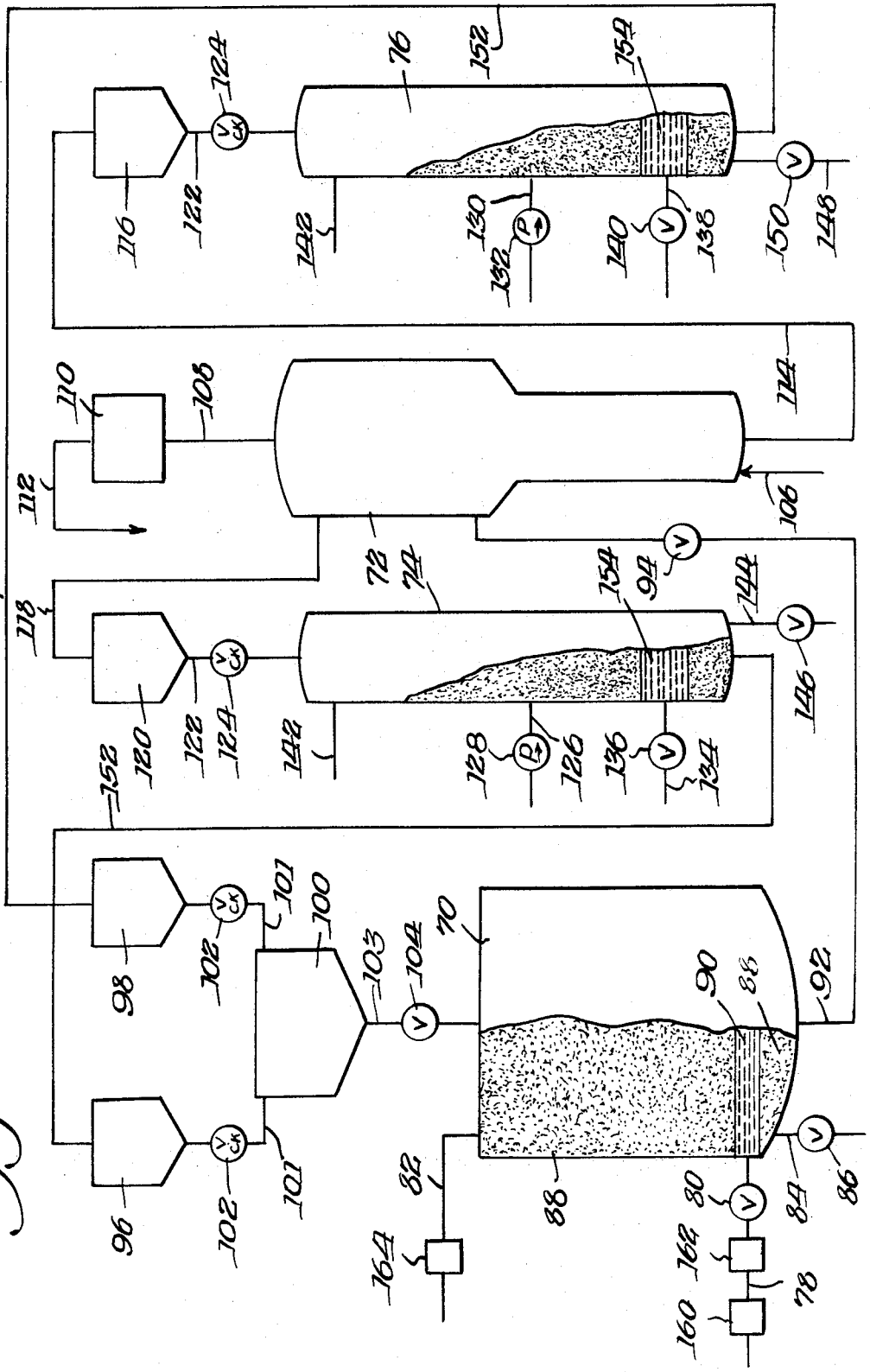
FIG. 2 is a diagrammatic view of a more complex ion-exchange system embodying the features of the present invention.

Referring now to FIGS. 2 and 3, the control method and apparatus of the present invention may also be employed in conjunction with a more complex ion-exchange system. The system shown in FIG. 2 is of the type commercially known as a "continuous countercurrent" system.

The apparatus shown in FIG. 2 is designed to demineralize water in a mixed bed of anion- and cation-exchange resins. The system also separates and regenerates the resins and returns the regenerated resins to the service column. To these ends, the system has a service column 70, a separation column 72, an anion resin regeneration column 74, and a cation resin regeneration column 76.

The service column 70 has a raw water inlet pipe 78, having a raw water valve 80, communicating with a lower portion thereof, and a treated water outlet pipe 82 communicating with an upper portion. The service column 70 also has a liquid discharge outlet pipe 84 having a valve 86 communicating with the column 70 at the bottom. In normal operation, water under pressure is passed through mixed anion and cation exchange resins 88 in an upflow direction. As shown in the drawing, the inflow of water through the raw water inlet pipe 78 produces a separation or gap 90 in the ion-exchange resins 88. This gap contains liquid only. The resins 88 below the gap 90 are urged by pressure out of the column 70 through an exhausted resin transfer line 92 which communicates with the separation column 72.

A valve 94 is located on the exhausted resin transfer line 92 so that the flow of resin from the service column 70 may be controlled. This valve 94 may conveniently be controlled automatically in accordance with the resin level in the separation column 72, so that a relatively constant level is maintained. It is preferred that the exhausted resin transfer line 92 communicate with a separation column 72 at approximately the point of normal separation between the anion and cation exchange resins, so that a minimum of disturbance will be produced by the introduction of exhausted resin into the separation column 72.

Fresh resin which has been regenerated in the regeneration columns 74, 76 is retained above the service column 70 in an anion resin metering hopper 96 and a cation resin metering hopper 98. A mixing hopper 100 is positioned below the metering hoppers 96, 98 and above the service column 70. Regenerated resin in the metering hoppers 96, 98 is periodically transferred to the mixing hopper 100, through resin transfer lines 101 having valves 102. The anion and cation exchange resins are mixed in the mixing hopper 100. A resin inlet line 103 having a check valve 104 provides communication between the mixing hopper 100 and an upper portion of the service column 70.

When it is desired to supply regenerated resin to the service column 70, a "liquid discharge cycle" is initiated. In this cycle, the raw water valve 80 is closed, and the column 70 is depressurized by opening the valve 86 on the liquid discharge outlet pipe 84. This allows the resin 88 in the service column 70 to move downwardly, closing the gap 90. At the same time, the check valve 104 on the resin inlet line 103 is opened, allowing mixed regenerated resin to flow into the service column 70. The valve 86 on the liquid discharge outlet pipe 84 is then closed, and the column is repressurized by delivering water under pressure through the raw water inlet pipe 78 upwardly through the resin, resuming normal operation. The gap 90 is re-formed by resin being compacted in an upper portion of the column by the upwardly flowing raw water, and also by being forced out of the bottom of the service column 70 through the exhausted resin transfer line 92. Such transfer occurs whenever the valve 94 in the exhausted resin transfer line 92 is open. Since the opening of the valve 94 occurs automatically when there is a drop in resin level in the separation column 72, such resin transfer will occur primarily when resin is being transferred out of the separation column, as hereinafter described.

The separation column 72 separates resins according to their densities by delivering water through the column in an upflow direction at a controlled rate of speed. Water enters the separation column 72 through a water inlet line 106 communicating with the lower portion thereof, and passes upwardly through the separation column 72 to a water outlet line 108 communicating with an upper portion. The water passes through the water outlet line 108 to a separation column head tank 110, which maintains the proper pressure head within the separation column 72. The water is removed from the head tank 110 through a water outlet line 112. In the preferred commercial apparatus, the separation tank 72 has a relatively narrow lower portion and a relatively wide upper portion, as shown in the drawing, so that the flow per unit area through a given cross section will be higher in the lower portion than it is in the upper portion. Thus, the flow per unit area is higher through the more dense cation-exchange resin than it is through the less dense anion-exchange resin. This variation in flow per unit area enhances the efficiency of separation.

Cation exchange resin is withdrawn at the bottom of the separation column through the cation resin outlet pipe 114 which communicates with a cation resin regeneration hopper 116 above the cation regeneration column 76. Similarly, the anion exchange resin is withdrawn from the upper portion of the separation column 72 and is transferred through an anion resin outlet pipe 118 through an anion resin regeneration hopper 120 above the anion regeneration column 74. Resin is delivered from the regeneration hoppers 116, 120 to the regeneration columns 76, 74, respectively, through resin transfer pipes 122 having check valves 124.

Both of the regeneration columns 74, 76 operate in a similar manner. Regenerant is delivered to the anion regeneration column 74 through a regenerant inlet pipe 126 having an anion regenerant pump 128. Similarly, regenerant is delivered to the cation regeneration column 76 through a regenerant inlet line 130 having a cation regenerant pump 132. Water is delivered to the anion column 74 through a separation water inlet line 134 having a valve 136, and to the cation regeneration column 76 through a separation water inlet line 138 having a valve 140. This delivery of water below the regenerant inlet lines 126, 130, rinses the resin after regeneration, as the resin moves downwardly through the regeneration columns 74, 76 during the liquid discharge cycles. Both the separation water and the regenerant are withdrawn from each regeneration column 74, 76 through an upper outlet line 142.

A drain pipe 144 having a valve 146 communicates with the bottom of the anion regeneration column 74, while a similar drain pipe 148 having a valve 150 communicates with the bottom of the cation regeneration column 76.

Resin is transferred from the regeneration columns 74, 76 through a regenerated resin pipe 152 communicating with the anion and cation resin metering hoppers 96, 98, respectively. The size of these metering hoppers 96, 98 determines the volume of resin that will be delivered from the regeneration columns 74, 76 after each liquid discharge cycle, as hereinafter described. For this reason, the hoppers 96, 98 are termed "metering hoppers."

The operation of the regeneration columns 74, 76 is similar to the operation of the service column 70. During the regeneration cycle, all valves are closed except for the valves 136, 140 on the separation water inlet lines 134, 138. The flow of water through the separation water inlet lines 134, 138 produces a separation or gap 154 containing liquid only in each of the regeneration columns 74, 76. Resin below the separation water inlet lines 134, 138 is forced out of the columns 74, 76 through the regenerated resin pipe 152 to the metering hoppers 96, 98. This movement of resin ceases when the metering hoppers 96, 98 are filled. The resin above the separation water inlet lines 134, 138 is compacted in an upper portion of the column, above the level of the lines. At the same time, regenerant is introduced into the columns 74, 76 through the regenerant inlet lines 126, 130. In the case of the anion exchange resin, sodium hydroxide solution forms a suitable regenerant, while hydrochloric or sulfuric acid may be employed to regenerate the cation exchange resin. Because of the pressure within the columns 74, 76 the check valves 124 on the resin transfer pipe 122 remain closed. The flow of regenerant through the columns 74, 76 is halted after a determined period of time as hereinafter described.

Exhausted resin is introduced into the regeneration columns 74, 76 in a liquid discharge cycle by closing the valves 136, 140 on the separation water inlet lines 134, 138. The valves 146, 150 on the drain pipes 144, 148 are opened, and the columns are depressurized, so that resin flows downwardly, closing the gap 154. This depressurization permits the check valves 124 to open, and exhausted resin flows into the columns 74, 76 from the regeneration hoppers 116, 120. At the same time, the valves 102 on the resin transfer lines 101 are opened, dumping the regenerated and rinsed resin from the metering hoppers 96, 98 into the mixing hopper 100.

In accordance with the present invention, the above-described liquid discharge cycles of the service column 70 and regeneration columns 74, 76 are automatically controlled in accordance with the conductivity of the raw water being delivered to the service column 70 and the flow rate of the water through the service column 70. To this end, in the embodiment shown, the raw water inlet pipe 78 has a conductivity cell 160 and a flow meter 162. The treated water outlet pipe 82 has a second conductivity cell 164, which provides an alarm signal if the conductivity of the upflowing water becomes excessively high, indicating that the resin 88 in the service column 70 has become overly exhausted. Thus, the second conductivity cell 164 operates as a safety device.

Referring to FIG. 3, the control system employed for the embodiment of FIG. 2 is basically the same as that shown in FIG. 1, although it is more complex because of the more complex ion-exchange system involved. As with the embodiment in FIG. 1, the control system shown in FIG. 3 includes a conductivity indicator 166 and a transducer 168 for converting the electrical signal from the conductivity indicator 166 to a fluidic signal. This fluidic signal is transferred to a computing relay 170 through an air line 171 as with the embodiment shown in FIG. 1. Similarly, the flow meter 162 produces a pneumatic signal which is delivered to a square root extractor 172. The square root extractor 172 converts the signal from the flow meter 162 to a linear signal. This fluidic signal is also delivered to the computing relay 170, through an air line 171.

The computing relay 40 delivers a pneumatic signal through an air line 171 to an integrator switch 173, which produces electronic pulses corresponding to a given quantum of ions flowing through the raw water inlet pipe 78, i.e., a given increment of a conductivity multiplied by flow rate, as indicated by the computing relay 170. These pulses are transmitted through electrical conduit 174 to a service interval counter 176 and a regeneration interval counter 178. If the service column 70 and regeneration columns 74, 76 were always to go through their liquid discharge cycles at the same time, only one interval counter would be required. However, in most systems of the type shown in FIG. 2, the regeneration columns 74, 76 will go through liquid discharge cycles more frequently than the service column 70, and therefore will not operate simultaneously with the service column 70.

When the service interval counter 176 counts out a predetermined number of pulses, it delivers a signal to a service cycle timer 180, which starts the liquid discharge cycle in the service column 70. To this end, the service cycle timer delivers a signal through electrical conduit 174 to close the raw water valve 80 and to open the valve 86 on the liquid discharge outlet pipe 84. This causes the liquid discharge cycle to take place, introducing regenerated resin into the service column 70 as previously described. When the service cycle timer 180 indicates that sufficient time has elapsed to accomplish the introduction of sufficient resin into the service column 70, the timer 180 delivers a signal to open the raw water valve 80 and to close the valve 86 on the liquid discharge pipe 84. At the same time, the service cycle timer delivers a signal to the service interval counter to re-set the counter for the next service period.

The regeneration interval counter 178 will ordinarily require a lower count in order to signal a liquid discharge cycle in the regeneration columns 74, 76. When the pre-determined count is reached, the regeneration interval counter delivers a signal to a regeneration cycle timer 182 to start the liquid discharge cycle in the regeneration columns 74, 76. The regeneration cycle timer provides the signal through the electrical conduit 174 to open the valves 146, 150 on the drain pipes 144, 148. At the same time, the valves 136, 140 on the separation water inlet lines 134, 138 are closed. This liquid discharge cycle closes the gap 154 and permits exhausted resin to flow downwardly into the regeneration columns 74, 76 as previously described. If either of the regenerant pumps 128, 132 is running, the regeneration cycle timer 182 has override means which prevent the liquid discharge cycle from being performed until the regenerant pumps 128, 132 have been stopped.

After a sufficient pre-determined time interval has elapsed to complete the liquid discharge cycle in the regeneration columns 74, 76, the regeneration cycle timer 182 provides a signal to close the valves 146, 150 on the drain pipes 144, 148, respectively, and to re-open the valves 136, 140 on the separation water inlet lines 134, 138, respectively, and the valves 102 on the resin transfer lines 101. The regeneration cycle timer 182 also provides a signal through electrical conduit 174 to the regenerant pump timer 184, which starts the regenerant pumps 128, 132. After a sufficient time has elapsed to provide the required regeneration of the resin delivered to the regeneration columns 74, 76 from the regeneration hopper 120, 116, respectively, the regenerant pump timer delivers a signal to the regenerant pumps 128, 132 to stop the pumps. In some instances, the regeneration columns 74, 76 are designed so that more than one regenerant interval is required to fully regenerate the resin. That is, the resin may remain at a level above the regenerant inlet lines 126, 130 through two or more liquid discharge cycles, so that regenerant is passed through the resin during two or more intervals of regenerant pump operation.

The regeneration cycle timer 182 also provides a signal to the regeneration interval counter to re-set the counter for the next liquid discharge cycle.

The individual components of the control system of the present invention are all commercially available items. An example of a suitable commercially available conductivity cell, such as those indicated by reference numerals 26 and 160, is the Beckman Catalog No. CEL-VSIT-K-XT 4/12 sold by Beckman Instruments, Fullerton, California. A suitable commercially available conductivity indicator, such as those indicated by reference numerals 32 and 166, is the Beckman Model RA5-S8, which has a 3-15 psi pneumatic output. A suitable transducer, as indicated by reference numerals 36 and 168, is sold by Moore Products, Springhouse, Pennsylvania, under Catalog No. 7712. A commercially available flow meter that can be used in accordance with the present invention, such as those indicated by reference numerals 28 and 162, is the Foxboro Model 13A1 differential pressure cell, made by Foxboro, Inc., Foxboro, Massachusetts. Suitable square root extractors, as indicated by reference numerals 44 and 172, are the Foxboro square root extractor No. 557 and the Bailey type KC1610A, made by the Bailey Meter Co., Cleveland, Ohio.

A suitable computing relay, as indicated by reference numerals 40 and 170, is a Foxboro Analog Computer, Model 556-8, manufactured by Foxboro, Inc., and having a 3-15 psi pressure output. This pressure signal is converted into electronic pulses by the integrator switch 46, 173. A suitable commercially available integrator switch is the Fisher & Porter Miniature Indicating Integrator, Model 52-1231-WR20B, sold by Fisher & Porter, Warminster, Pennsylvania.

Interval counters, such as those indicated by reference numerals 48, 176, and 178, are manufactured by Automatic Timing Controls, King of Prussia, Pennsylvania. One suitable interval counter is the ATC Model 310 D.

Finally, suitable timers, such as those indicated by reference numerals 56, 180, 182, and 184, are also manufactured by a number of companies, such as Automatic Timing Controls.

The following example is intended to illustrate the present invention, and should not be construed as limitative, the scope of the invention being determined by the appended claims.

EXAMPLE

In this example, an ion exchange system of the type shown in FIGS. 2 and 3 was employed. The service column 70 contained a mixed bed of resins consisting of about 31 cubic feet of Rohm & Haas Amberlite IRA-900 strong base anion exchange resin and about 25 cubic feet of Rohm & Haas Amberlite 200 strong acid cation exchange resin. The foregoing volumes are for the resin above the gap 90. The cross sectional area of the resin (measured perpendicular to flow) was about 16 square feet. The column was designed to take in 14.05 cubic feet of resin from the mixing hopper 100 during each liquid discharge cycle, so that 6.25 cubic feet of cation exchange resin and 7.80 cubic feet of anion exchange resin was delivered to the service column during each cycle.

The conductivity cell 160 was a Beckman No. CEL-V-SIT-K-XT 4/12 having integral temperature compensation, and having a cell constant of 1.0. The conductivity indicator 166 was a Beckman No. RA5-S8, 0-500 micromhos, standard 0-10 mv. output, designed for 115 v., 60 Hz. operation. The flow meter 162 was a Foxboro Model 13A1 differential pressure cell, and the square root extractor 172 was a type KC1610A, model BB, 3-15 psi. output made by Bailey Meter Co. The transducer 168 was a millivolt to psi. transducer catalog no. 7712, made by Moore Products Company. It had an input range of 0-10 mv. and an output range of 3-15 psi. The computing relay 170 was a Foxboro Model 556-8 analog computer designed for functional multiplication of two pressure inputs of 3-15 psi., and having a linear output of 3-15 psi. This multiplier was connected to deliver its pressure output to an integrator switch 173, in this instance a Fisher & Porter Miniature Indicating Integrator, Model 52-1231-W20B, designed for operation on linear inputs of 3-15 psi. and having an eight-digit counter. Both of the counters 176, 178 are sold by Automatic Timing Controls under catalog no. 305D-011-A-10-PX, and have a range of 0-240 counts.

The raw water being fed to the column was analyzed, and was found to contain calcium cations as the primary impurity. Therefore, calculations were based on the cation resin only, since the cation resin would be exhausted first. Simulated raw water samples were made up containing the same balance of impurities as found in the actual raw water, and having varying amounts of total dissolved solids. The conductivity of these samples was measured with the conductivity cell 160 and conductivity indicator 166. The transducer 168 was calibrated to deliver the pressure outputs shown in Table I, below:

TABLE I

| Dissolved solids, ppm. | Conductivity, micromhos | Transducer output, psi. |
|---|---|---|
| 0 | 0 | 3 |
| 130 | 250 | 6 |
| 260 | 500 | 9 |
| 390 | 750 | 12 |
| 520 | 1000 | 15 |

Water was fed through the service column 70 at various known flow rates, and the pressure output of the square root extractor 172 was calibrated as shown in Table II, below:

TABLE II

| Influent flow, gal/min | Square Root Extractor Output, psi. |
|---|---|
| 0 | 3 |

| 125 | 6 |
| 250 | 9 |
| 375 | 12 |
| 500 | 15 |

With both the transducer and square root extractor delivering an output of 15 psi., the computing relay was set to produce an output of 15 psi., corresponding to the product of conductivity and flow rate.

Based on the foregoing data, the rate of solids delivery to the service column at 520 ppm and 500 gal./min. was converted to pound equivalents of calcium carbonate per hour as follows:

520 ppm = $1.14 \times 10^{-3}$ lb./l.

$$\frac{1.14 \times 10^{-3} \text{ lb./l.}}{50 \text{ lb. } CaCO_3/\text{lb. equiv.}} = 2.29 \times 10^{-5} \text{ equiv. } CaCO_3/\text{l.}$$

$2.29 \times 10^{-5}$ lb. equiv./l. $\times$ 3.785 l/gal = $8.67 \times 10^{-5}$ lb. equiv./gal/

$8.67 \times 10^{-5}$ lb. equiv./gal. $\times$ 500 gal/min. $\times$ 60 min./hr. = 2.6 lb. equiv./hr.

Thus, an output of 15 psi. from the computing relay is known to be equivalent to 2.6 lb. equiv. $CaCO_3$/hour.

The capacity of the cation resin is known emperically to be 0.028 lb. equiv./ft.$^3$, and 6.25 ft.$^3$ of cation exchange resin is taken into the service column during each liquid discharge cycle. Thus, the interval between liquid discharge cycles is calculated as follows:

6.25 ft.$^3$/cycle $\times$ 0.028 lb. equiv./ft.$^3$ = 0.175 lb. equiv./cycle $$\frac{0.175 \text{ lb.} - \text{equiv./cycle}}{2.6 \text{ lb. equiv./hour}} \times 60 \text{ min./hr.} = 4.04 \text{ min./cycle}$$

Thus, at 520 ppm. solids and 500 gal/min., the service column must go through the liquid discharge cycle after each 4.04 minutes of operation.

The integrator switch 173 was set to deliver a pulse every 6 seconds (10 pulses per minute) corresponding to pressure inputs of 15 psi. from the integrator switch 173. The adsorption interval counter was then set to initiate the liquid discharge cycle after 40 counts.

The cation metering hopper 98 held 3.12 cubic feet of resin, while the anion metering hopper 96 held 3.9 cubic feet. Since these metering hoppers 96, 98 determine the volume of resin transferred from the regeneration columns 74, 76 during each liquid discharge cycle for these columns, it is seen that the liquid discharge cycle must be carried out twice for the regeneration columns 74, 76 for each time the liquid discharge cycle is carried out in the service column 70. Thus, the regeneration interval counter 178 was set to initiate the liquid discharge cycle in the regeneration columns 74, 76 after each 20 counts from the integrator switch 173. The cation exchange resin was regenerated by delivery of a total of 80 liters of 1N. sulfuric acid over a total time period of three minutes. The anion resin was regenerated with a total of 55 liters of 3N. sodium hydroxide delivered over the same total time period. In this instance, the regeneration columns 74, 76 were designed so that the resin remained above the level of the regenerant inlet lines 126, 130 through two liquid discharge cycles. Therefore, after each liquid discharge cycle the regenerant pumps were operated for a period of about 1.5 minutes, to deliver 40 liters of 1N. sulfuric acid to the cation regeneration column 76 and 27.5 liters of 3N. sodium hydroxide to the anion regeneration column 74.

The square root extractor and the transducer were next calibrated for a delivery rate of 300 gal./min. and 310 ppm. dissolved solids. These values produced an output of 10.2 psi. from both the square root extractor and the transducer. By a calculation similar to that to that set forth above, it was determined that, at these levels, the service column must go through a liquid discharge cycle after each 11.2 minutes of operation. Since the liquid discharge cycle occurs after the adsorption interval timer has counted out 40 pulses, the computing relay was calibrated to deliver 3.6 pulses per minute.

In order to test the calibration, the unit was operated with raw water having a known solids content of 208 ppm. producing a conductivity of 400 micromhos. This water was delivered at a flow rate of 375 gal/min. The output of the square root extractor was 12 psi., while that of the transducer was 4.8 psi. By calculation, it was determined that the interval between liquid discharge cycles under these conditions should be 13.4 minutes. The computing relay produced 3 pulses per minute, initiating the liquid discharge cycle after a period of 13.35 minutes, indicating that the unit was operating properly.

Subsequent to the above testing procedure, the unit was placed on stream. The raw water was deionized, while the unit automatically adjusted to variations in input flow rate and dissolved solids content of the raw water. Operating economy was also much improved over apparatus which controlled the transfer of resin on a time basis alone.

Obviously, many modifications and variations of the invention as hereinbefore set forth will occur to those skilled in the art, and it is intended to cover in the appended claims all such modifications and variations as fall within the true spirit and scope of the invention.

We claim:

1. A method for controlling the provision of regenerated resin to an ion exchange column comprising: measuring the conductivity of the raw water flowing to said column; measuring the flow of the water delivered to said column; multiplying said conductivity by said flow; totalizing the product of said conductivity and said flow; and providing said column with regenerated resin when the total of said product reaches a predetermined level.

2. The method as defined in claim 1 wherein said ion exchange resin is a mixed bed of anion and cation exchange resins.

3. A method for controlling the regeneration and transfer of ion exchange resins in an ion exchange system having a service column and a regeneration column comprising: measuring the conductivity of the raw water flowing to said service column; measuring the flow of water through said service column; multiplying said conductivity by said flow; totalizing the product of said conductivity and said flow; supplying regenerated resin to said service column when the total of said product reaches a predetermined level; delivering exhausted resin to said regeneration column when said total reaches a predetermined level; and regenerating said resin in said regeneration column.

4. The method as defined in claim 3 wherein said ion exchange resin is a mixed bed of anion and cation exchange resins, and wherein said ion exchange system includes a resin separation column, an anion exchange resin regeneration column, and a cation resin regeneration column.

5. In an apparatus for treating water by ion exchange having a service column containing ion exchange resin and raw water delivery means for delivering raw water to said service column, an improved control system comprising: conductivity measuring means for measuring the conductivity of the water in said raw water delivery means; flow measuring means for measuring the flow of water through said service column; multiplier means for multiplying said conductivity by said flow; totalizer means for totalizing the product of said conductivity and said flow; and means for automatically providing said service column with regenerated resin responsive to a signal from said totalizer indicating that the total of said product has reached a predetermined level.

6. The apparatus as defined in claim 5 wherein said flow measuring means comprises a flow meter producing a signal proportional to the square root of the flow through said service column and square root extractor means for converting said signal to a signal that is linearly proportional to said flow.

7. The apparatus as defined in claim 6 wherein said flow meter and said square root extractor means produce a pneumatic signal, and wherein said conductivity measuring means comprises a conductivity cell and a conductivity indicator that produce an electrical signal together with transducer means for converting said electrical signal to a pneumatic signal.

8. The apparatus as defined in claim 7 further comprising means for producing electronic pulses responsive to a signal from said multiplier means, each pulse being proportional to a predetermined value of the product of said signal from said square root extractor and from said transducer means; and means for transmitting said pulses to said totalizer means.

9. The apparatus as defined in claim 8 wherein said flow meter measures the flow in said raw water delivery means.

10. In an apparatus for treating water by ion exchange having a service column containing a mixed bed of anion and cation exchange resins, separation means for separating said resins, an anion resin regeneration column, a cation resin regeneration column, and raw water delivery means for delivering raw water to said service column, an improved control system comprising: conductivity measuring means for measuring the conductivity of the raw water in said raw water delivery means; flow measuring means for measuring the flow of water through said service column; multiplier means for multiplying said conductivity by said flow; totalizer means for totalizing the product of said conductivity and said flow; means for automatically terminating the delivery of raw water and for initiating the delivery of regenerated resins to said service column responsive to a signal from said totalizer indicating that said product has reached a first predetermined level; timer means for resuming delivery of raw water to said service column a predetermined time after said termination; means for automatically delivering exhausted resin to said regeneration columns responsive to a signal from said totalizer indicating that said product has reached a second predetermined level; timer means for terminating said delivery of exhausted resin to said regeneration column; means for automatically initiating the delivery of regenerant to said regeneration column; and regenerant timer means for terminating the delivery of said regenerant after a predetermined interval.

11. The apparatus as defined in claim 10 wherein said flow measuring means comprises a flow meter producing a signal proportional to the square root of the flow through said service column and square root extractor means for converting said signal to a signal that is linearly proportional to said flow.

12. The apparatus as defined in claim 11 wherein said flow meter and square root extractor means produce a fluidic signal, and wherein said conductivity measuring means comprises a conductivity cell and a conductivity indicator that produces an electrical signal together with transducer means for converting said electrical signal to a fluidic signal.

13. The apparatus as defined in claim 12 further comprising means for producing electronic pulses responsive to a signal from said multiplier means, each pulse being proportional to a predetermined value of the product of said signal from said square root extractor means and from said transducer means; and means for transmitting said pulses to said totalizer means.

14. The apparatus as defined in claim 13 wherein said flow meter measures the flow in said raw water delivery means.

* * * * *